Nov. 14, 1961     J. VAN MELLE     3,008,695
AIR CONDITIONING INSTALLATIONS
Filed April 15, 1959     2 Sheets-Sheet 1

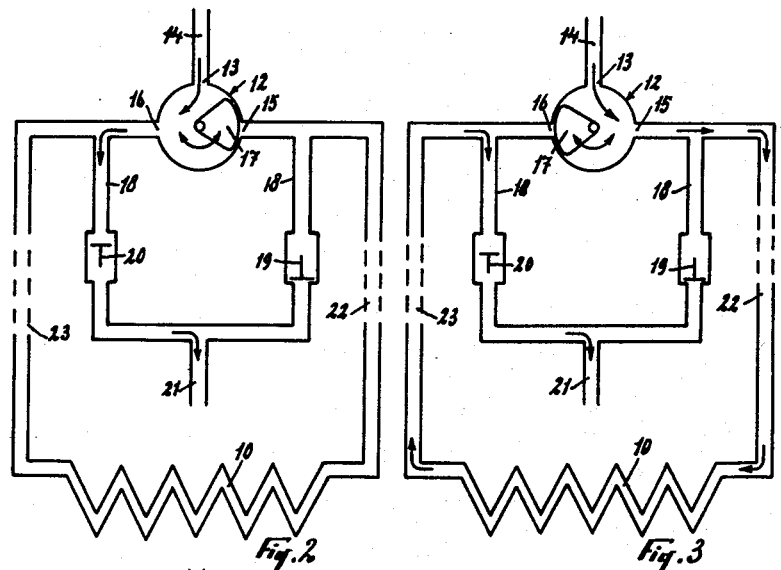
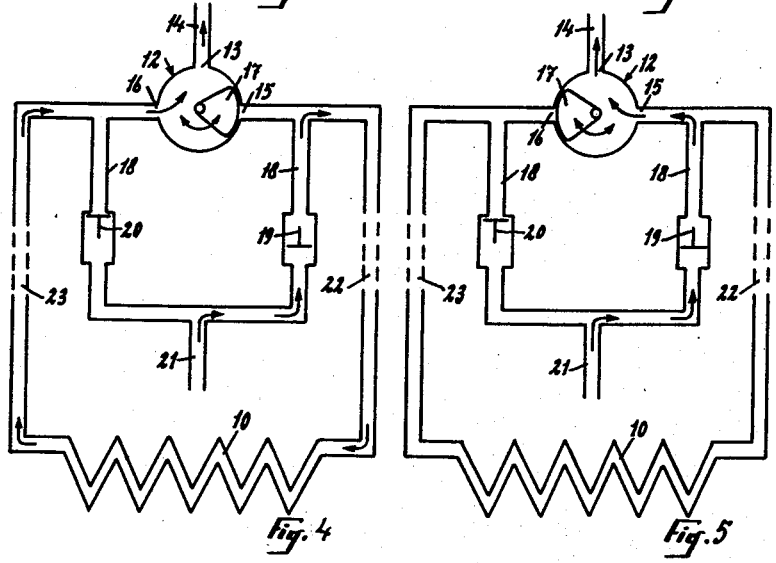

United States Patent Office 3,008,695
Patented Nov. 14, 1961

3,008,695
AIR CONDITIONING INSTALLATIONS
Jan van Melle, Hilversum, Netherlands, assignor to N.V. Bronswerk, Amsterdam, Netherlands, a Dutch company
Filed Apr. 15, 1959, Ser. No. 806,643
Claims priority, application Netherlands Apr. 21, 1958
3 Claims. (Cl. 257—297)

The present invention relates to an air conditioning installation comprising one or more heat exchangers, each connected to a main circuit through which either a heating fluid or a cooling fluid may be circulated at will the direction of flow of the heating fluid being opposite to the direction of flow of the cooling fluid, wherein the said heat exchangers are each provided with a regulating device, which installation always yields a higher temperature in the associated heat exchanger on adjustment in a certain direction and a lower temperature on adjustment in the opposite direction independently of the selected circulating fluid.

In known installations of this kind, the opposite directions of flow of the heating fluid and the cooling fluid, respectively, are utilized for operating an electric mechanism for adjusting a valve in the regulating device, when the nature of the circulating fluid is changed.

It is an object of the invention to provide an air conditioning installation in which the regulating device is constructed in a simpler manner.

It is a further object of the invention to provide an air conditioning installation, wherein the direction of flow of the fluid in the heat exchanger is always the same, independently of whether a heating fluid or a cooling fluid is circulated in the main circuit.

It is a still further object of the invention to provide an air conditioning installation, wherein the adjustment of the regulating device does not influence the rate of circulation in the main circuit.

For this purpose, the air conditioning installation according to the invention is characterized in that the regulating device comprises a T-joint, of which one passage is connected to the main circuit, while the two other passages can be varied by means of an adjustable closing member and are interconnected through a bypass circuit comprising two back pressure valves, to be lifted in opposite directions, as viewed from the T-joint, the said bypass circuit being connected to the main circuit at a point between the back pressure valves, and the heat exchanger being connected to both adjustable passages in parallel with the bypass circuit.

In this way, a considerable simplification of the regulating device for each heat exchanger is achieved as the opposite directions of flow of the heating fluid and the cooling fluid are utilized, with the aid of the said back pressure valves, in such a way that no exterior adjustments of the regulating device are necessary when the nature of the circulating fluid is changed, so that the electric adjusting mechanism used in the known installation can be omitted whereas nevertheless independently of the question whether the cooling or the heating installation is in action an adjustment of the closing member in a certain direction always causes a higher temperature and an adjustment in the opposite direction always causes a lower temperature in the associated heat exchanger.

Furthermore the direction of flow of the fluid in the heat exchanger is always the same, independently of whether a heating fluid or a cooling fluid is circulated through the main circuit. This is a very important feature, since the air generally passes the heat exchanger in an invariable direction, so that optimal heat transfer conditions may be obtained.

The invention will be further explained with reference to the drawings representing an embodiment of the invention.

FIGS. 2 and 3 show schematically an embodiment of the regulating device for a heat exchanger of an air conditioning installation according to the invention in two different positions for summer service.

FIGS. 4 and 5 show schematically two positions of the regulating device according to FIGS. 2 and 3 for winter service.

Figure 1:
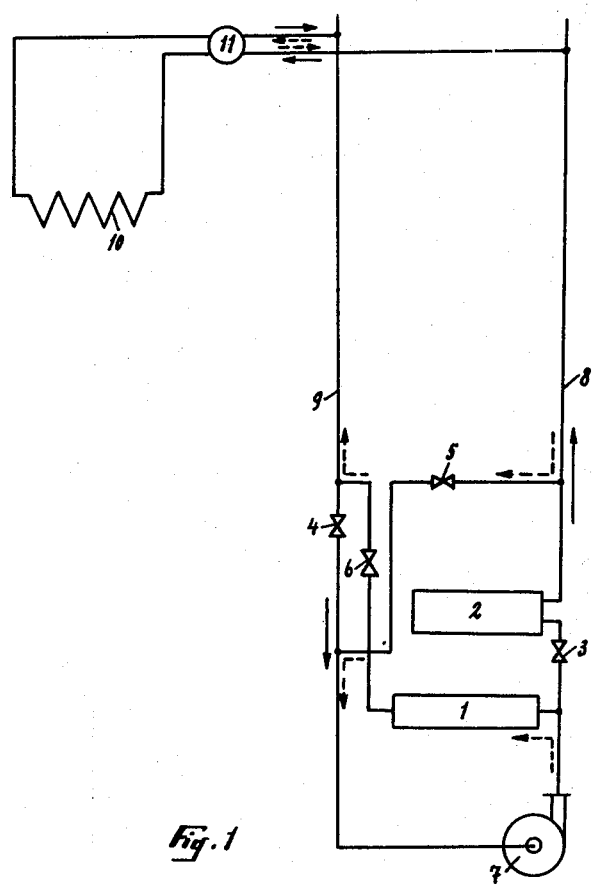
FIG. 1 shows a circuit diagram of an air conditioning installation according to the invention.

The air conditioning installation according to the invention is devised in such a way that heat can be either supplied to or withdrawn from the rooms to be conditioned at will, the installation being provided for this purpose with a plurality of heat exchangers arranged in these rooms and connected to a main circuit, through which a heating or cooling medium may be circulated. For this purpose, the circuit represented in FIG. 1 comprises both a heater 1 and a cooler 2 one of which is switched on during the operation of the installation.

On working with a cooling medium, i.e. during the summer season when heat is to be withdrawn from the surroundings, the cooler 2 is in action and the valves 3 and 4 are open while the valves 5 and 6 are closed so that the cooling fluid is circulated by the circulating pump 7 through the main circuit, in the direction of flow indicated by the arrows drawn in full lines.

If, on the other hand, a heating fluid is supplied, i.e. during the winter season when heat must be supplied to the surroundings, the heating installation 1 is in action and the valves 5 and 6 are open while the valves 3 and 4 are closed, so that the heating fluid is pumped by the circulating pump through the main circuit in the direction of flow indicated by the arrows drawn in dotted lines.

Between the main circuit branches 8 and 9, a plurality of heat exchangers 10 are connected in parallel. Only one of these heat exchangers is shown in FIG. 1 but the number of heat exchangers is determined, in practice, in dependence on the rooms to be conditioned.

According to the present invention, every heat exchanger 10 is connected with the main circuit through a regulating device 11, to be fully described hereinafter, which is devised in such manner that on adjustment in a certain direction the temperature of the associated heat exchanger 10 is raised and that on adjustment in the opposite direction the temperature of the heat exchanger 10 is lowered independently of the question whether a heating or a cooling fluid is circulated through the main circuit.

For this purpose, the regulating device shown in FIGS. 2–5 comprises a T-joint 12, of which one passage 13 is connected to the main circuit branch 8 through a pipe 14, while the two other passages 15 and 16 may alternately be completely or partially closed by a rotatable plug body 17.

In the position of the plug body 17 as represented in FIGS. 2 and 4, the passage 15 is completely closed and the passage 16 is entirely open, while in FIGS. 3 and 5 the second extreme position of the plug body 17 is represented, wherein the passage 15 is entirely open and the passage 16 is completely closed.

The passages 15 and 16 are connected to a bypass circuit 18 wherein two back pressure valves 19 and 20 are arranged. Through a pipe 21, connected with the bypass circuit 18 at a point between valves 19 and 20, the regulating device is connected to the main circuit branch 9.

The heat exchanger 10 is connected in parallel with the bypass circuit 18, and communicates with the passages 15 and 16 of the T-joint 12.

In FIGS. 2 and 3, the regulating device is represented as used in summer, i.e. with a circulating cooling fluid. The cooling fluid flows from the main circuit branch 8 through the pipe 14, into the regulating device and returns through the pipe 21 to the main circuit branch 9.

In FIGS. 4 and 5 the regulating device is represented as used in winter, i.e. with a circulating heating fluid. The heating fluid flows in this case from the main circuit branch 9 through the pipe 21 into the regulating device and returns through the pipe 14 to the main circuit branch 8.

In FIGS. 2 and 4 the plug body 17 is positioned in the "hot" position, in which the passage 15 is closed and the passage 16 is opened.

During summer service in this "hot"-position of the plug body 17 (FIG. 2), the cooling fluid flows from the main circuit branch 8 through the pipe 14, the T-joint 12, the passage 16, the bypass circuit 18 and the open valve 20 and then returns through the pipe 21 to the main circuit branch 9. Consequently, the cooling medium does not flow through the heat exchanger 10, so that the same has its highest summer temperature.

During winter service the heating fluid flows in the "hot"-position of the plug body 17 (FIG. 4), from the main circuit branch 9 through the pipe 21, the bypass circuit 18, the open valve 19, and the pipe 22 to the heat exchanger 10, and returns through the pipe 23, the open passage 16, the T-joint 12 and the pipe 14 to the main circuit branch 8. Thus, the heat exchanger 10 receives the total amount of heating fluid passing through the regulating device, so that the depicted "hot"-position of the plug body 17 also corresponds with the highest temperature of the heat exchanger 10 during winter service as well.

In FIGS. 3 and 5, the plug body 17 is set in its "cold"-position, in which the passage 16 is closed and the passage 15 is open.

During summer service, in this "cold"-position of the plug body 17 (FIG. 3), the cooling fluid flows through the open passage 15 and the pipe 22 to the heat exchanger 10, and returns through the pipe 23, the pipe 18, the open valve 20 and the pipe 21 to the main circuit branch 9.

During winter service in the "cold"-position of the plug body 17 (FIG. 5) the heating fluid flows from the main circuit branch 9 through the pipe 21, the pipe 18, the open valve 19, the open passage 15, the T-joint 12 and the pipe 14 to the main circuit branch 8, so that the heat exchanger 10 is bypassed and remains cold, corresponding with the "cold"-position of the plug body 17.

It will be evident that in an intermediate position of the plug body 17, only a part of the supplied heating or cooling fluid passes through the heat exchanger so that an intermediate heating or cooling is obtained. Always however in summer as well as in winter, a further movement of the plug body 17 towards the "cold"-position results in a lower temperature and a movement towards the "hot"-position in a higher temperature of the associated heat exchanger 10.

The invention is not restricted to the embodiment as shown in the drawings, which may be varied in different ways within the scope of the invention.

What I claim is:

1. Heat transfer apparatus comprising first and second system conduits both adapted for selectively conveying heating and cooling media, means operatively associated with said conduits to circulate heating media from the first conduit to the second conduit and to circulate cooling media from the second conduit to the first conduit, and heat exchange means coupled between said conduits and adapted, for heating, to receive the heating medium from the first conduit and discharge the heating medium into the second conduit and, for cooling to receive the cooling medium from the second conduit and discharge the cooling medium into the first conduit; said heat exchange means comprising a heat exchanger, connection means coupling opposite ends of said heat exchanger to said first conduit, control means for controllably isolating the ends from said first conduit, pipes respectively connecting said ends to said second conduit, and oppositely directed unidirectional valves in said pipes, said valves and control means cooperating to selectively control the circulation of said media through said heat exchanger.

2. Apparatus as claimed in claim 1 wherein said connection means is a T-connector.

3. Apparatus as claimed in claim 1 wherein said pipes have a common connection with said second conduit.

References Cited in the file of this patent

UNITED STATES PATENTS 1,315,766    Feldman _____ Sept. 9, 1919

FOREIGN PATENTS 1,146,592    France _____ Nov. 13, 1957